Sept. 5, 1944.　　　　G. T. DOWNEY　　　　2,357,582
VALVE ASSEMBLY
Filed Feb. 19, 1943　　　2 Sheets-Sheet 1
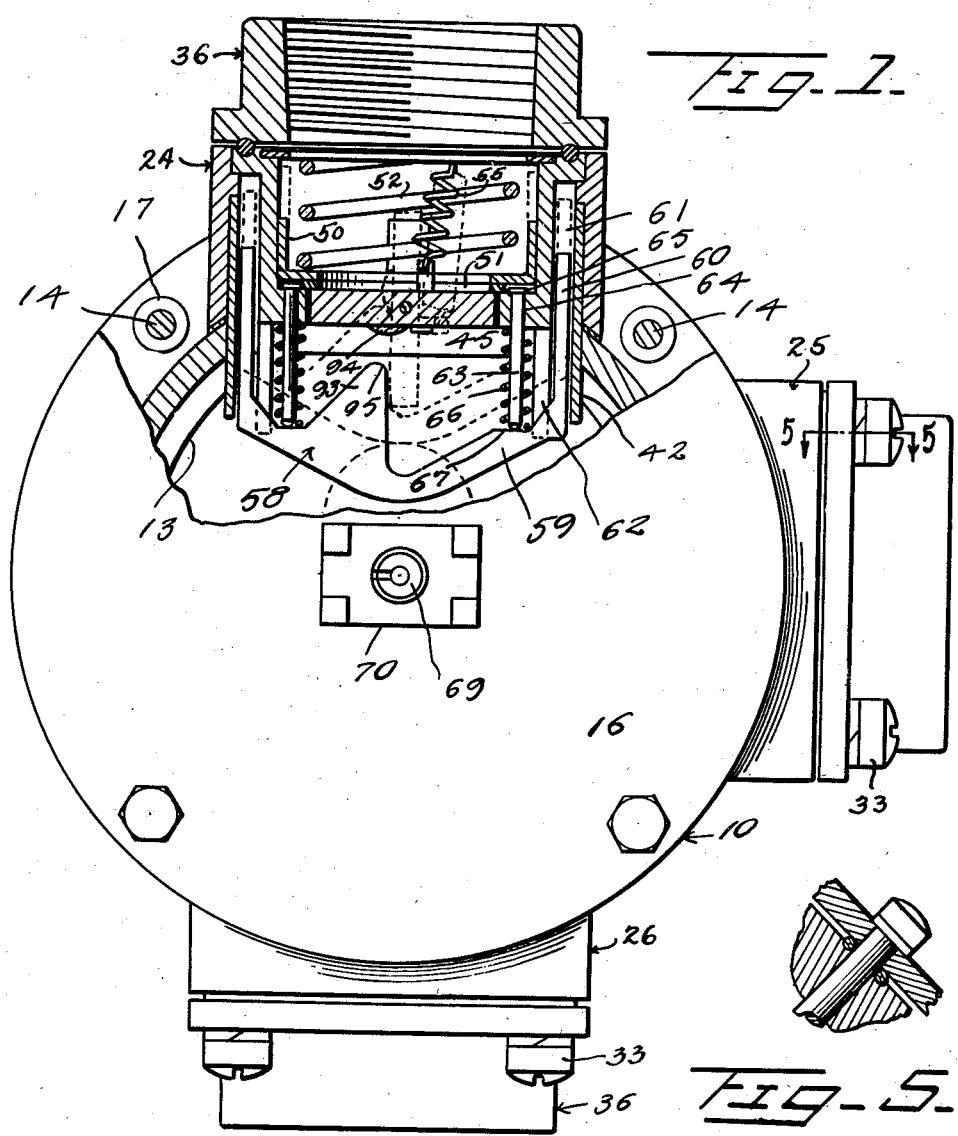
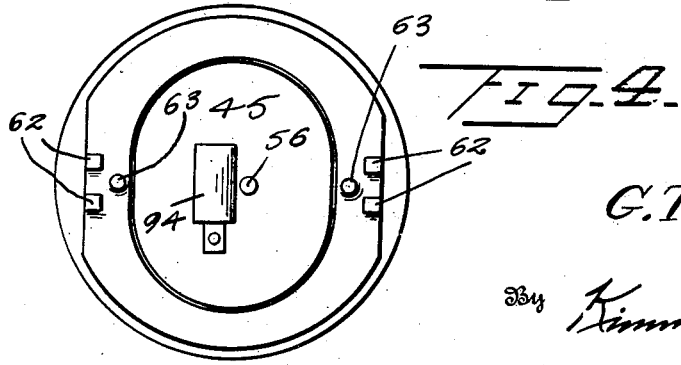
Inventor
G. T. Downey
By Kimmel & Crowell
Attorneys

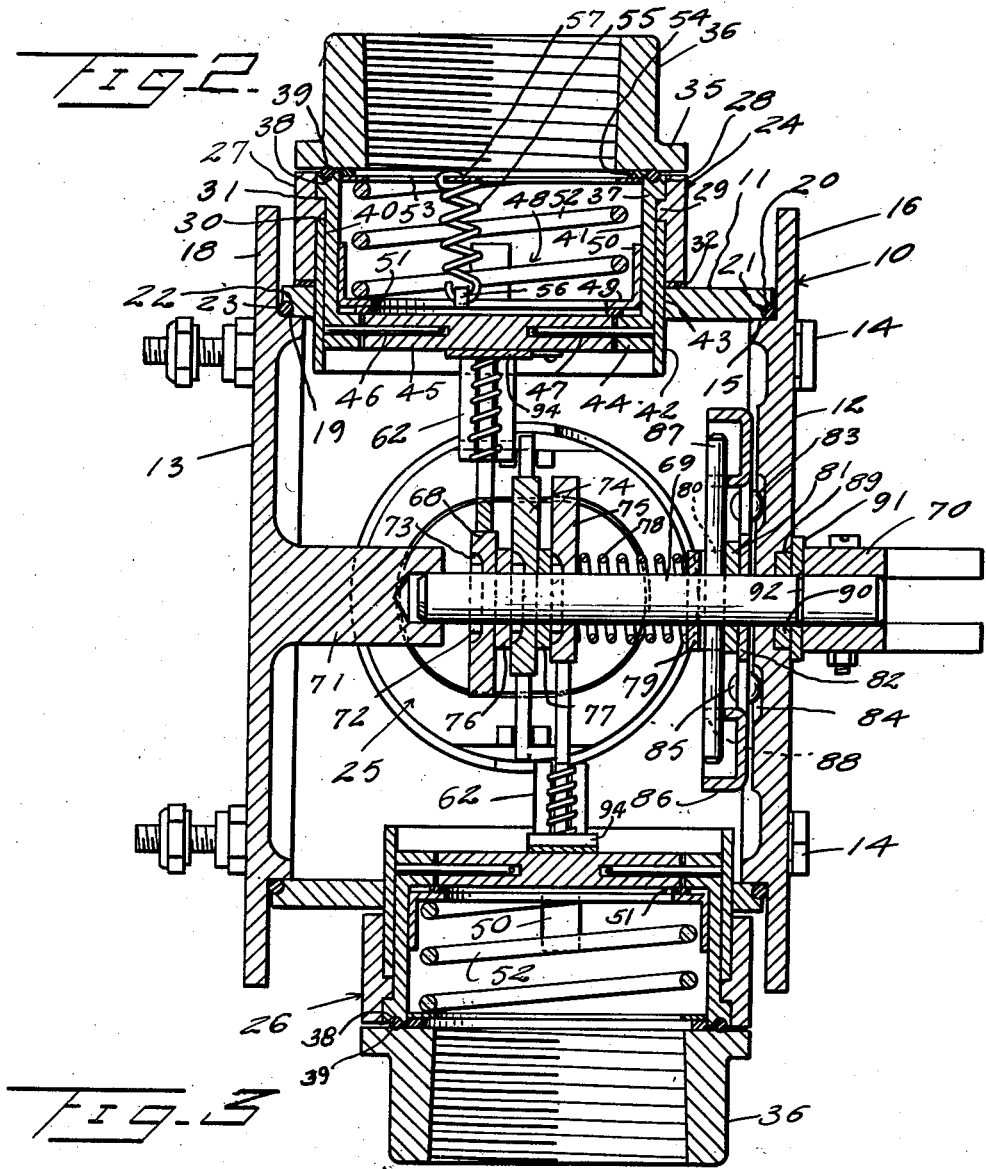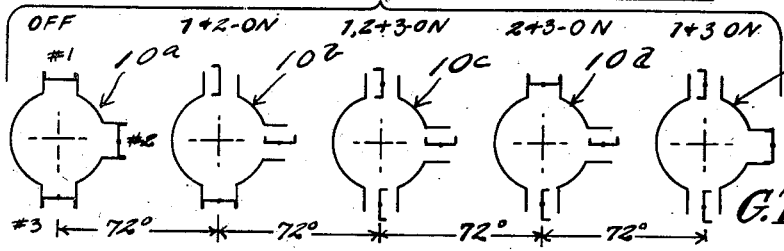

UNITED STATES PATENT OFFICE 2,357,582

VALVE ASSEMBLY

George T. Downey, Corry, Pa., assignor to Aero Supply Mfg. Co. Inc., Corry, Pa.

Application February 19, 1943, Serial No. 476,446

10 Claims. (Cl. 251—125)

This invention relates to valve assemblies and is an improvement over the structure embodied in my prior Patent No. 2,299,615 dated October 20, 1942.

An object of this invention is to provide a valve assembly using a pivoted or hinged valve member having an improved operator for moving the valve member to open position.

Another object of this invention is to provide in a device of this kind an improved sealing means for sealing the valve member, the sealing means being movable axially of the valve port under the action of cam operated pins which are so constructed and arranged as to delay movement of the sealing means toward sealing position until the valve member has moved to a closed position.

A further object of this invention is to provide in a device of this kind an operator for the valve member which is adapted to initially release the valve member from a portion of the spring tension thereon, and to subsequently positively move the valve member to an open position.

A further object of this invention is to provide an improved valve structure embodying the use of a removable valve assembly so as to facilitate repair or replacement of the parts thereof.

The invention consists of the novel construction, combination and arrangement of parts as will be more specifically referred to and illustrated in the accompanying drawings, wherein are shown embodiments of the invention, but it is to be understood that changes, variations and modifications may be resorted to which fall within the scope of the invention as claimed.

In the drawings:

Figure 1 is a detail front elevation partly broken away and in section of the valve assembly constructed according to an embodiment of this invention.

Figure 2 is a vertical sectional view taken through the assembly,

Figure 3 is a diagrammatic view showing the various positions of the valve members, Figure 4 is a bottom plan of one of the valve seats, and Figure 5 is a fragmentary sectional view taken on the line 5—5 of Figure 1.

Referring to the drawings, the numeral 10 designates generally a housing which includes a cylindrical body 11 having heads 12 and 13 secured thereto by means of bolts 14. The head 12 is the front head, whereas the head 13 is the rear head. The head 12 is formed with a rabbeted portion 15 for permitting a portion of the head 12 to extend interiorly of the cylindrical body 11 and the bolts 14 extend through the flange 16 formed outwardly of the rabbeted portion 15. Tubular spacer members 17 engage about the bolts 14 between the flange 16 and the flange 18 formed on the rear head 13.

The rear head 13 is provided with a rabbeted portion 19 so that a portion of the head 13 may extend inwardly of the cylindrical body 10. The body 10 at its forward end is formed with an annular groove 20 within which a ring-shaped sealing member 21 is adapted to engage. The body 11 is also formed at the rear end thereof with an annular groove 22 within which a ring-shaped sealing member 23 is adapted to engage.

The body 10 has removably mounted thereon in circumferentially spaced apart relation a plurality of radially arranged valve structures 24, 25 and 26. The valve structures 24, 25 and 26 are arranged with the centers thereof progressively offset from each other, the purpose for which will be hereinafter described. Each of the valve structures is of like construction and the detailed description of one of these structures will apply equally as well to the other valve structures.

The valve structure 24 includes a tubular housing 27 which is substantially square in transverse section and is formed with a bore 28 extending therethrough. An annular rib 29 is formed interiorly of the housing 27 between the ends of the bore 28, thereby forming inner and outer shoulders 30 and 31. A sealing gasket 32 is interposed between the inner end of the housing 27 and the periphery of the housing 11. The housing 27 is adapted to be removably secured to the housing 11 by means of fastening bolts 33, and sealing members 34 are disposed about the bolts 33 between a flange 35 carried by a connector 36 and the outer end of the housing 27.

A valve seat member or cage 37 is disposed within the housing 27, being formed adjacent the outer end portion thereof with an annular flange or rib 98 seating on the shoulder 31. A sealing member 39 is interposed between the outer end of the cage 37 and the inner side of the flange 35. The cage 37 is provided with an oblong outer side 40 and an oblong inner side 41. The cage 37 is adapted to snugly engage within a cylindrical sleeve 42 which is firmly secured in an opening 43 formed in the body 11. The sleeve 42 projects inwardly into the body 11 and also projects outwardly of the body 11 and at its outer end abuts against the inner shoulder 30 formed by the rib 29.

The housing 27 snugly engages about that portion of the sleeve 42 which projects outwardly of the body 11. The insertion of the sleeve 42 in the body 11 permits the construction of the body 11 from cylindrical material and eliminates the necessity of casting or molding the body 11 with the housing 27 mounted thereon.

The cage 37 at its inner end is formed with an oblong flange 44 which is disposed outwardly from the inner end of the sleeve 42 as shown in Figure 4. An oblong valve member or plate 45 is adapted to loosely engage within the flange 44 and is rockably mounted on a pair of pivot members 46 which extend from the cage 37 through the flange 44 and into openings 47 formed in the valve member 45.

A valve seal carrier member 48 is slidably mounted within the cage 37, the carrier member being provided with a lower horizontal flange 49 and opposed angular guides 50 which slidably engage the inner side 41 of the cage 37. The carrier member 48 is adapted to have secured to the inner side of the flange 39 a resilient sealing member 51. The sealing member 51 is mounted on the inner side of the flange 49 in such a position as to overlie the confronting edges of the flange 44 and the valve member 45 thereby sealing the valve member 45 with respect to the flange 44.

A spring 52 is mounted within the cage 37, the inner end of the spring 52 bearing against the flange 49 and the outer end of the spring 52 bearing against a spider 53 which is disposed within the cage 37 and bears against a sealing member 54 interposed between the inner end of the connector 36 and the spider 53. The spring 52 constantly urges the carrier member 48 to a sealing position and the valve member 45 is constantly urged to a closed position by means of a spring 55. The spring 55 has its inner end secured to a bolt or screw 56 which is extended through the valve member 45 at one side of the long diameter thereof, as shown in Figure 4, and the opposite end of the spring 55 engages about an arm or spoke 57 formed integral with the spider or perforate plate 53.

In order to move the valve member 45 to an open position, I have provided a U-shaped valve operator, generally designated as 58. The valve operator 58 has a substantially V-shaped bight 59 and parallel arms 60. The arms 60 slidably engage in the space 61 formed between the flat sides of the cage 37 and the inner side of the cylindrical sleeve 42. The arms 60 are also slidably mounted between a pair of inwardly projecting guide members 62 which are formed integral with and project inwardly from the cage 37. A pair of pins 63 are slidable in openings 64 formed in the flange 44 and are provided at their outer ends with a head 65 adapted to engage the outer side of the flange 44.

The head 65 is adapted to contact with the inner side of the flange 49 when the operator 58 is moved outwardly so as to raise the carrier member 48 from the seat or flange 44 and from the outer side of the valve member 45 against the tension of the spring 52. The operator 58 is constantly urged inwardly by means of springs 66 which are disposed about the pins 63 and bear at their outer ends against the inner side of the flange 44 and bear at their inner ends against a shoulder 67 formed in the bight 59 of the operator 58.

The operator 58 is moved outwardly to a valve opening position by means of a cam 68 which is mounted on a cam shaft 69. The cam shaft 69 is journaled through the head 12 and is provided at its outer end with a yoke or connector 70 to which a handle or other suitable operating means may be secured. The cam shaft 69 is mounted at its inner end in a bearing stud 71 which is formed integral with the head 13 and projects inwardly of the body 11. The cam 68 is held against rotation relative to the shaft 69 by means of a locking pin 72 which engages in a groove or cutout 73 formed in one side of the cam 68. The cam shaft 69 also has mounted thereon additional cams 74 and 75 which are of a configuration similar to the cam 68, but are circumferentially adjusted with respect to the cam 68.

The cam 74 which is correlated with the valve structure 25 is spaced from the cam 68 by means of a spacing washer 76 and the cam 75 which is correlated with the valve structure 26 is spaced from the cam 74 by means of a washer 77. A spring 78 is disposed about the shaft 69 and bears at its inner end against the cam 75 so as to hold the cam 75 in engagement with its locking pin and the washer 77 is held by means of the spring 78 against the cam 74. In like manner the cam 74 bears against the washer 76 which in turn bears against the cam 68. In this manner all of the cams are held in locked position with respect to the cam shaft 69 by means of the single spring 78.

The outer end of the spring 78 bears against a U-shaped member 79 which engages about the shaft 69 and which has the parallel legs 80 thereof bearing against a washer 81. An index plate 82 is interposed between the washer 81 and the inner side of the head 12. The index plate 82 is selectively held against rotation with respect to the head 12 by means of a plurality of balls 83. The balls 83 engage partly in recesses 84 formed in the inner side of the head 12 and also engage in detents 85 which are formed in the outer side of the plate 82. The plate 82 is formed with an inwardly projecting flange 86 within which an index plate locking pin 87 engages.

The pin 87 extends diametrically through the cam shaft 69 and is held against movement relative to the plate 82 by means of inwardly projecting pairs of fingers 88. The head 12 is formed with an annular recess 89 in the outer side thereof within which a sealing gasket 90 is adapted to engage. A washer 91 is mounted about the shaft 69 and bears against the sealing member 90. A split locking ring 92 is carried by the shaft 69 and holds the washer 91 against outward movement with respect to the shaft 69.

Referring now to Figure 5, there are disclosed the various positions of the valve members. The numeral 10a shows the various valve structures in closed position and the numeral 10b shows the valve structures 24 and 25 in open position. The numeral 10c shows all of the valve structures in open position. The numeral 10d shows the valve structures 25 and 26 in open position and the numeral 10e shows the valve structures 24 and 26 in open position.

In the use and operation of this valve assembly, the several connectors 36 correlated with the valve structures 24, 25 and 26 may be connected to suitable pipe lines, one of the pipe lines being an outlet pipe line, whereas two of the pipe lines may be intake pipe lines connected at their opposite ends to a source of fluid supply. Rotation of the cam shaft by means of the yoke 70 will move the cam member 68 to a position where the valve operator 58 will be forced outwardly. Initial outward movement of the operator 58 will raise the tension releasing pins 63 and raise the carrier 48 with the sealing member 51 from the flange 44 and the valve member 45.

Additional outward movement of the operator 58 will bring the valve rocking lug 93, which is carried by the bight 59, into engagement with a cam member 94 which is fixed to the inner face of the valve member 45. The cam member 94 has a convex outer surface and the nose 45 of the lug 93 is also convex so that the valve member 45 may readily rock to an open position when the lug 93 contacts with the cam member or abutment 94. Rocking of the valve member 94 will place the spring 55 under tension and the valve member 45 will be maintained in open position as long as the cam 68 holds the operator 58 in its outward valve opening position.

When the cam shaft 69 is rotated to a valve closing position, the operator 58 will be moved inwardly by the tension of the spring 52 and the pin springs 66. The lug 93 will move inwardly out of contact with the cam 94 prior to the complete inward movement of the operator 58 so that the spring 55 will be able to move the valve member 45 to a closed position, which is the position shown in Figure 4 before the carrier 48 moves to its inward sealing position. When the operator 58 is in its innermost position, the sealing member 51 will again be disposed over the joint between the valve member 45 and the flange 44 so as to seal the joint. The several cam members 68, 74 and 75 are mounted on the cam shaft 69 in circumferentially offset position so that a selected one or several of the valve structures may be moved to either open or closed position.

When the cam shaft 69 is rotated, the index plate 82 will rotate therewith and will be held in the desired position by engagement of the balls 83 in selected detents 85 formed in the index plate 82. The valve assembly hereinbefore described may be constructed for the most part out of either plastic material with certain parts out of metal, or may be constructed entirely out of metal. This valve assembly is designed particularly for use in airplanes for controlling the flow of gasoline to the desired carburetors of selected engines from selected fuel tanks.

What I claim is:

1. A valve assembly comprising a housing, a valve structure carried by said housing, said valve structure comprising, a cage in said housing formed with an inwardly projecting flange, a valve member pivotally mounted within said flange, a sealing member engageable over the joint between said flange and valve member, a carrier fixed to said sealing member and slidable in said cage, means for moving said carrier outwardly, and means correlated with said first means for rocking said valve member to open position.

2. A valve assembly comprising a housing, a valve structure carried by said housing, said valve structure comprising, a cage in said housing formed with an inwardly projecting flange, a valve member pivotally mounted within said flange, a sealing member engageable over the joint between said flange and valve member, a carrier fixed to said sealing member and slidable in said cage, a spring constantly urging said carrier inwardly, a second spring constantly urging said valve member to closed position, means for moving said carrier outwardly, and means correlated with said first means for rocking said valve member to open position.

3. A valve assembly comprising a housing, a valve structure carried by said housing, said valve structure comprising, a cage in said housing formed with an inwardly projecting flange, a valve member pivotally mounted within said flange, a sealing member engageable over the joint between said flange and valve member, a carrier fixed to said sealing member and slidable in said cage, a spring constantly urging said carrier inwardly, a second spring constantly urging said valve member to closed position, an operator for said valve member slidably carried by said cage, cam means for moving said operator outwardly to valve opening position, means interposed between said carrier and said operator for moving said carrier outwardly when said operator is moved outwardly, and means carried by said operator engageable with said valve member upon outward movement of said operator for rocking the valve member to open position.

4. A valve assembly comprising a housing, a valve structure carried by said housing, said valve structure comprising, a cage in said housing formed with an inwardly projecting flange, a valve member pivotally mounted within said flange, a sealing member engageable over the joint between said flange and valve member, a carrier fixed to said sealing member and slidable in said cage, a spring constantly urging said carrier inwardly, a second spring constantly urging said valve member to closed position, an operator for said valve member slidably carried by said cage, cam means for moving said operator outwardly to valve opening position, means interposed between said carrier and said operator for moving said carrier outwardly when said operator is moved outwardly, and means carried by said operator engageable with said valve member upon outward movement of said operator for rocking the valve member to open position, said latter means being so constructed and arranged that said valve member will be rocked to open position subsequent to the initial outward movement of said carrier.

5. A valve assembly comprising a housing, a valve structure carried by said housing, said valve structure including a cage, a rockable valve member carried by said cage, sealing means slidably carried by said cage for sealing said valve member in said cage, a spring constantly urging said sealing means to sealing position, a second spring constantly urging said valve member to closed position, means for rocking said valve member to open position, and means operated by said latter means for raising said sealing means from said valve member.

6. A valve assembly comprising a housing, a valve structure carried by said housing, said valve structure including a cage, a rockable valve member carried by said cage, sealing means slidably carried by said cage for sealing said valve member in said cage, a spring constantly urging said sealing means to sealing position, a second spring constantly urging said valve member to closed position, means for rocking said valve member to open position, and means operated by said latter means for raising said sealing means from said valve member prior to the initial rocking of said valve member to open position.

7. A valve assembly comprising a housing, a valve structure carried by said housing, said valve structure including a rockable valve member, an axially shiftable sealing means for said valve member, means constantly urging said sealing means to sealing position, means constantly urging said valve member to closed position, and means engageable with said sealing means and said valve member for raising said sealing means therefrom and for rocking said valve member to open position.

8. A valve assembly comprising a housing, a valve structure carried by said housing, said valve structure including a rockable valve member, an axially shiftable sealing means for said valve member, means constantly urging said sealing means to sealing position, means constantly urging said valve member to closed position, an operator engageable with said sealing means and said valve member for raising the sealing means from said valve member and for rocking said valve member to open position, and cam means for said operator.

9. A valve assembly comprising a housing, a valve structure carried by said housing, said valve structure including a rockable valve member, an axially shiftable sealing means for said valve member, means constantly urging said sealing means to sealing position, means constantly urging said valve member to closed position, a U-shaped operator slidably carried by said valve structure, a pair of pins slidably carried by said valve structure laterally of said valve member and interposed between said operator and said sealing means, means carried by said operator engageable with said valve member for rocking the latter to open position, and means for moving said operator.

10. A valve assembly comprising a housing, a valve structure carried by said housing, said valve structure including a rockable valve member, an axially shiftable sealing means for said valve member, means constantly urging said sealing means to sealing position, means constantly urging said valve member to closed position, a U-shaped operator slidably carried by said valve structure, a pair of pins slidably carried by said valve structure laterally of said valve member and interposed between said operator and said sealing means, springs about said pins constantly urging said operator inwardly, means carried by said operator engageable with said valve member for rocking the latter to open position, and means for moving said operator.

GEORGE T. DOWNEY.